Jan. 23, 1940.    J. J. TILSON    2,188,211
TIRE TOOL
Filed Aug. 30, 1937
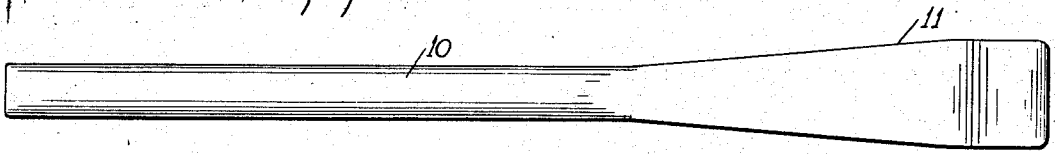
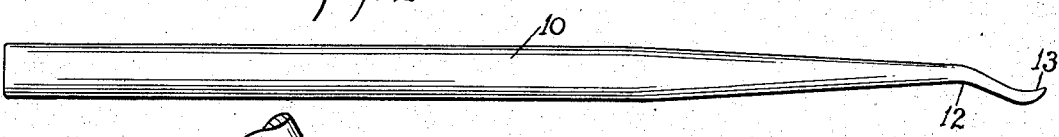
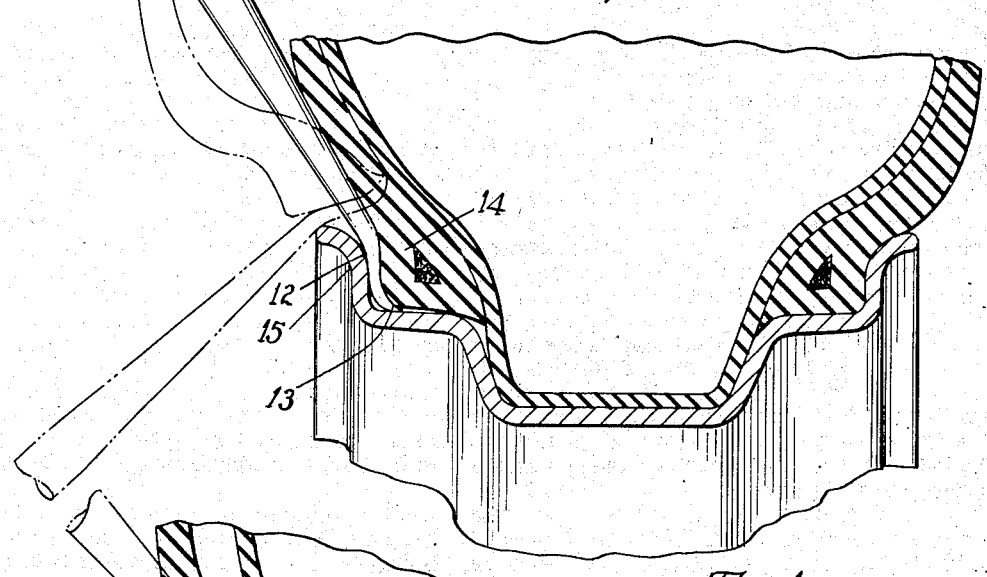
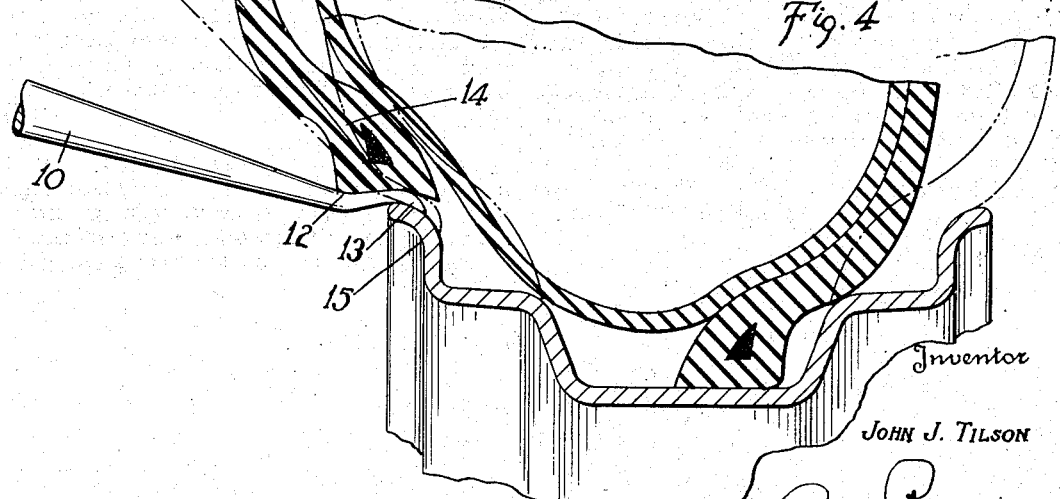
Inventor
JOHN J. TILSON
By J. Ralph Barrow
Attorney Patented Jan. 23, 1940

2,188,211

UNITED STATES PATENT OFFICE 2,188,211

TIRE TOOL

John J. Tilson, Rittman, Ohio

Application April 30, 1937, Serial No. 139,901

1 Claim. (Cl. 157—6)

This invention relates to tire tools.

The general purpose of the invention is to provide an improved tire tool capable of effective use both in removing and replacing automobile tires upon wheel rims.

Heretofore, such tools have comprised wide flat bars, two of which are ordinarily used at spaced points about the periphery of the tire. These are not entirely satisfactory in that frequently an inner tube is pinched by the tool, and the tool has a tendency to slip or "kick-out" from under the tire bead or off the tire rim during the tire-removing and tire-replacing operations.

One object of the present invention is to provide a tool so designed as not to tend to pinch an inner tube during the tire-removing or tire-replacing operations.

Another object of the invention is to provide a tool which so cooperates with the tire and rim during tire-removing and tire-replacing operations that "kicking-out" of the tool is effectively resisted to off-set the tendency of such tools to slip.

Another object of the invention is to provide a tire tool of such formation that in one position it is adapted for effective use for tire-removing operations and in a reversed position is adapted for effective use for tire-replacing operations.

The foregoing and other objects of the invention are attained in the tool shown in the accompanying drawing and described below. It is to be understood that the invention is not limited to the specific form thereof shown and described.

Of the accompanying drawing:

Figure 1 is a plan of a tire tool embodying the invention.

Figure 2 is an elevation thereof.

Figure 3 is a part radial section through a rim and tire showing the manner of using the tool for tire-removing operations.

Figure 4 is a similar view showing the manner of using the tool for tire-replacing operations.

Referring to the drawing, the numeral 10 designates a suitable handle and 11 a comparatively flat tool-end which is tapered from the handle portion to the tip thereof and formed with a saddle at 12 on one face of the tool adjacent the end of the tool and an oppositely curved lip 13 on the other face of the tool at the end thereof. The lip 13 is reversely bent out of an extension for the saddle so as to offset the lip as shown.

The tool shown is adapted for use in tire-removing as shown in Figure 3. The tool is inserted as shown in full lines in Figure 3 between the tire bead 14 and the rim flange 15 with the lip 13 up and saddle 12 down. The lip 13 is engaged under the edge of bead 14. The tool is then swung inwardly toward the rim center and may be worked further inwardly under the bead as the tool is being swung until the tool assumes the position shown in dotted lines in Figure 3 whereby the tire bead 14 is worked over the edge of flange 15, the tool riding on its saddle 12 on the edge of the rim flange 15 on which it fulcrums, the saddle 12 tending to prevent slippage of the tool off the rim flange and lip 13, as stated, preventing slippage of the tire bead off the tool. Thus the tendency of the tool to "kick-out" during tire-removing operations is resisted or prevented.

To use the tool for tire-replacing operations, the tool is reversed and engaged under the bead 14 with lip 13 fulcrumed on the flange 15 and the bead on saddle 12, as shown in full lines in Figure 4. The bead is then pried over the rim flange 15 by upward swinging of the tool to the dotted line position shown, the lip 13 sliding downwardly on the inside of flange 15 and the bead 14 sliding out of saddle 12 onto the rim.

It will be understood that one or more of these tools are used progressively to remove or apply the tire about the circumference of the rim.

Modifications of the invention may be resorted to without departing from the spirit thereof or the scope of the appended claim.

What is claimed is:

The tire tool having a handle and a tool-end tapered therefrom to the tip of the tool, said tool-end having a curved lip of comparatively short radius thereon at the extreme end of the tool on one face thereof, the curvature of said lip substantially equalling the curvature of the outer periphery of a tire rim flange, said tool-end having a saddle of comparatively long radius adjacent said end of the tool on the other face thereof, said lip being formed as a reversely bent extension from said saddle so as to be offset below the axis of the tool in tire-removing operations and above the axis of the tool in tire replacing operations, and said saddle being adapted to fulcrum on a rim flange during a tire-removing operation and to seat a bead therein during a tire-replacing operation, said lip being so short as to engage just under the outer side edge only of a tire bead and out of tube-pinching relation with the inner side edge thereof during a tire-removing operation and to fulcrum on said rim flange during a tire-replacing operation.

JOHN J. TILSON.